Nov. 7, 1933.  H. M. ROCKWELL  1,934,235
FRICTION BRAKE FOR VEHICLES AND THE LIKE
Original Filed Sept. 10, 1927   2 Sheets-Sheet 1
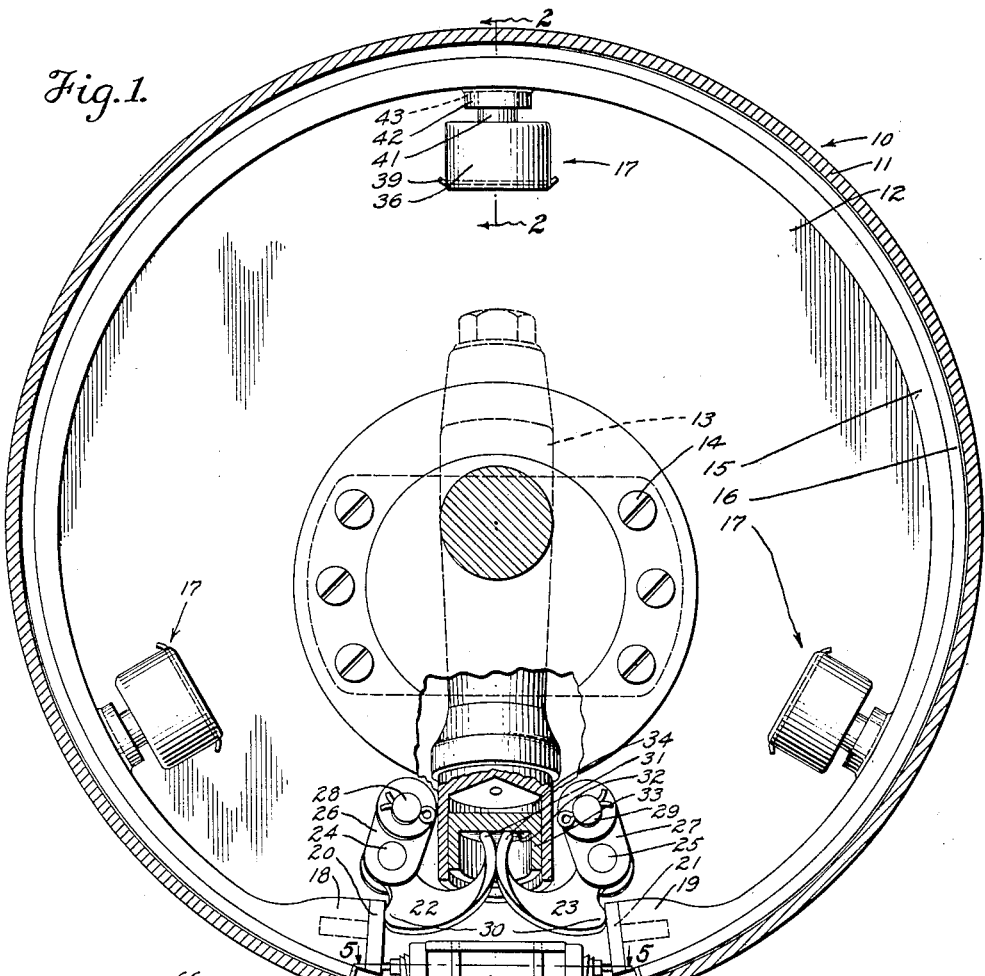
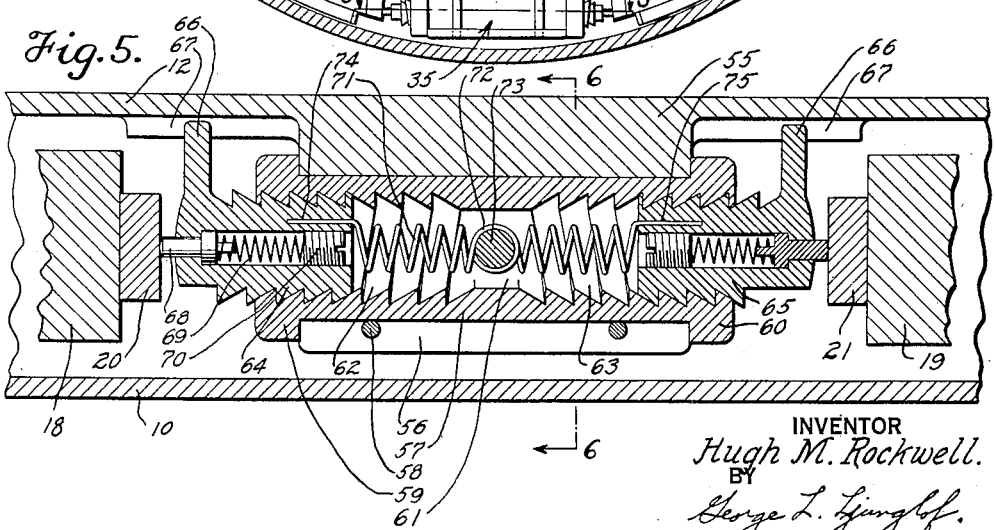
INVENTOR
Hugh M. Rockwell.
BY
George L. Ljungolf.
ATTORNEY Nov. 7, 1933.                H. M. ROCKWELL                1,934,235
                FRICTION BRAKE FOR VEHICLES AND THE LIKE
                Original Filed Sept. 10, 1927    2 Sheets-Sheet 2
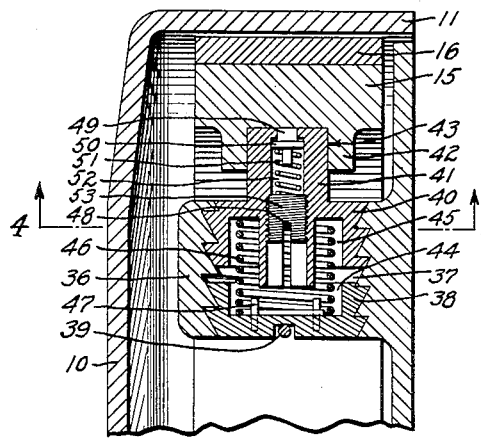
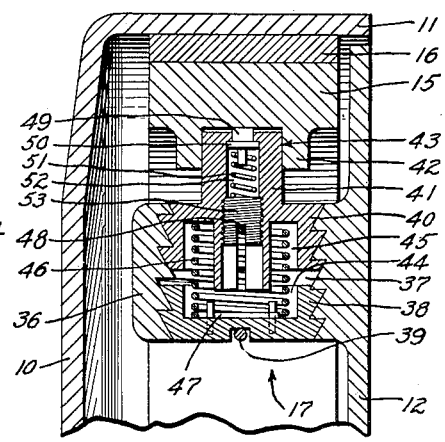
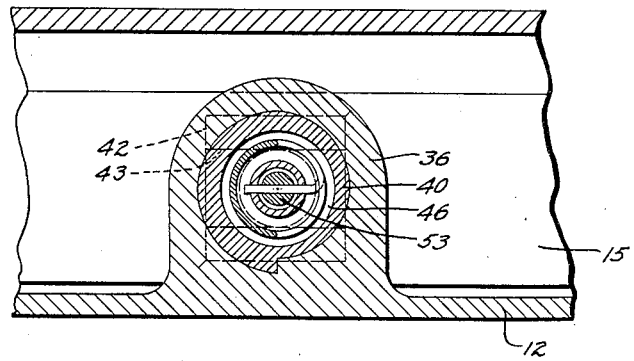
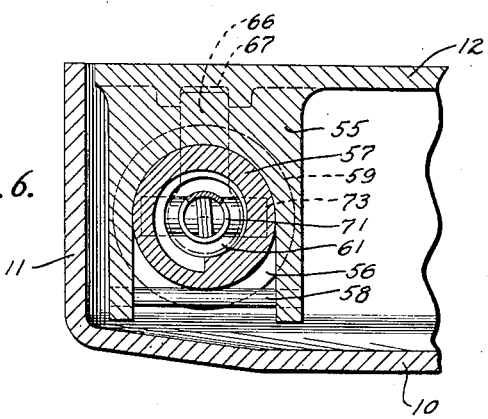
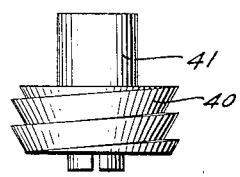
INVENTOR
Hugh M. Rockwell
BY
George L. Ljungloff
ATTORNEY Patented Nov. 7, 1933

1,934,235

UNITED STATES PATENT OFFICE 1,934,235

FRICTION BRAKE FOR VEHICLES AND
THE LIKE

Hugh M. Rockwell, New York, N. Y.

Application September 10, 1927, Serial No.
218,657. Renewed January 26, 1933

3 Claims. (Cl. 188—79.5)

This invention relates to improvements in brakes, and has particular reference to vehicle brakes which will be self-energizing and automatically adjustable to compensate for wear of the parts.

In order to obtain the desired friction, brakes are provided with brake shoes or brake bands lined with friction surface material, which in use wears down and therefore requires replacement from time to time. As this lining material wears, the range of movement necessary for the application of braking forces increases, and therefore the actuating means, such as a foot pedal in an automobile, develops a certain amount of lost motion. To overcome this condition the brakes require manual adjustment from time to time, and in many instances such adjustments are neglected or improperly made, sometimes leading to serious consequences. When the brake bands or brake shoes are disposed to engage the outside of the brake drum, the necessary adjustments can usually be made quite easily, but in the case of an internal brake as used in many vehicles, such adjustments cannot be easily made.

The foregoing objectional features of the prior art are overcome by the present invention, which has, as one of its objects, the provision of means for automatically adjusting the parts of the brake to compensate for wear of the brake band lining or its equivalent.

In one form of the invention, the automatic adjusting means are associated with a self-energizing brake, a feature of which is that the accumulated torque in the brake contributes materially to the braking force. This is accomplished by providing a brake band in the form of a split ring, and mounting it in a semi-floating condition with reference to the brake drum. The opposite ends of the brake band are spaced apart and adapted to straddle a fixed abutment member which prevents rotation of the brake band when the brake is actuated. The brake actuating means then acts upon the free end of the brake band and transmits the braking force without being impeded by the torque. The provision of such a self-energizing brake is therefore another object of the invention.

A still further object is to provide such a self-energizing brake with an adjustable abutment which automatically compensates for wear of the brake parts.

The foregoing and other objects, features, and advantages of the invention will be more readily apparent from the following description in connection with the accompanying drawings, wherein one form of the invention has been shown by way of illustration, and wherein Figure 1 is an elevation, partly broken away and partly in section, of a vehicle brake embodying the invention;

Fig. 2 is a vertical transverse sectional view on line 2—2 of Fig. 1, showing the relative positions of the parts when the brake is "off";

Fig. 3 is a view similar to Fig. 2 with the brake applied or "on";

Fig. 4 is a horizontal sectional view on line 4—4 of Fig. 2;

Fig. 5 is a transverse sectional view through the adjustable abutment, the section being on line 5—5 of Fig. 1;

Fig. 6 is a transverse sectional view on line 6—6 of Fig. 5; and

Fig. 7 is a detail elevation of the brake band limiting stud of Fig. 2.

Referring particularly to the drawings, the invention has been shown as applied to an internal expanding brake which includes a rotatable brake drum 10 having a peripheral flange 11, within the edge of which is fitted a stationary dust plate 12. The brake drum 10 is secured in any usual or desired manner to a rotatable element, for example to a wheel of an automobile, while the dust plate 12 is mounted on a non-rotatable element, such as a steering knuckle 13, by means of fastening elements 14. Disposed within the brake drum 10 is a brake band 15 in the form of a resilient split ring having secured to its outer face a lining 16 of friction material adapted to engage against the inner periphery of the flange 11 when the brake band is expanded. The brake band 15 may be formed of cast iron, steel, or other suitable resilient material, and normally tends to contract whereby to be disengaged from the flange 11, and said band 15 is suported in a substantially central position by supporting means 17 at spaced intervals as best shown in Fig. 1. The opposite ends 18 and 19 of the brake band are spaced apart and respectively provided with hardened steel buttons 20 and 21 for connection with or engagement by portions of the brake actuating means.

Any desired brake actuating means may be employed, that illustrated in the drawings being hydraulically operated, and constructed in accordance with the disclosure in my copending application for Letters Patent for Motor vehicles and braking systems therefor, bearing Serial Number 218,656, filed Sept. 10, 1927. Such hydraulic operating means comprises a pair of levers 22 and 23 which are respectively pivoted at 24 and 25 in the free ends of links 26 and 27 which, in turn, are pivotally supported at 28 and 29 on the dust plate 12. Said levers 22 and 23 have heel portions 30 which bear against the hardened steel buttons 20 and 21 of the brake band ends, and toe portions 31 which are in mutual rolling contact and bear against the bottom 32 of a piston 33 which is reciprocable in a fluid cylinder 34. When it is desired to apply the brake, fluid under pressure is forced into the cylinder 34 from a master cylinder, (not shown), causing the piston 33 to be moved outwardly and transmitting the pressure through the levers 22 and 23 to increase the space between the brake band ends.

The dust plate 12 carries an abutment 35 which is disposed between the spaced ends 18 and 19 of the brake band and adapted to prevent rotation of the band when it is expanded against the rotating drum 10. In view of the floating connection between the piston 33 and the levers 22 and 23, said levers will shift bodily with reference to said piston and will transmit the pressure to the other end of the brake band. This action is the same regardless of which direction the drum is rotated in, and in either case the accumulated torque in the brake band augments the manually applied braking force. The abutment 35 shown in the drawings is provided with automatic adjusting means to compensate for wear of the brake band lining 16, and will be more fully explained hereinafter.

Referring to the brake band supporting means 17 it is to be noted that there are three of such means illustrated in the drawings, substantially equidistantly spaced, but any other number of such units may be employed if desired, and as they are all alike in structure, a detail description of only one of them will be sufficient for a complete understanding of this feature of the invention. As shown in Figs. 1 to 4 inclusive, each of said means 17 includes a stationary boss 36 which is preferably integral with the dust plate 12 and projecting from the inner face thereof into the plane of the brake band 15. Said boss 36 is spaced inwardly from the periphery of the dust plate to accommodate the brake band 15 between it and the flange 11 of the brake drum. A threaded socket 37 is formed in the boss 36, at the side adjacent the brake band, by means of a bore which is radial to the axis of the brake and closed at its inner end by a plug 38 which is held against rotation by a transverse pin 39. A rotatable threaded element 40 is fitted loosely in the socket 37 and has a reduced cylindrical end portion 41 which constitutes a stop for the contraction of the brake band. At appropriate points on its inner periphery the brake band 15 is provided with lugs 42 corresponding in number and radial location with the supporting units 17, and each of said lugs is formed with an annular groove 43 in which the extremity of the adjacent end portion 41 is disposed. This arrangement is such that the brake band is held against lateral displacement yet is capable of slight rotary movement, and is in fact supported in a semi-floating condition. The plug 38 and rotatable element 40 have their opposed ends recessed as at 44 and 45 respectively for the reception of a torsion spring 46, which has one of its ends anchored at 47 to the plug 38, and its other end attached at 48 to said rotatable element 40. The screw threads of the members 36 and 40 may preferably be of the buttress type, and as previously stated have a loose fit whereby to be free to turn under the influence of spring 46 when not otherwise restrained, and said spring tends to advance the element 40 outwardly against the brake band.

In order to overcome the influence of the torsion spring 46 under normal conditions, the rotatable element 40 is provided with tension means which tends to force the said element 40 longitudinally inward and thus to impose substantial friction between the engaging threads. Such tension means includes a plunger 49 which is reciprocable through the end of the portion 41 and limited in its outward movement by a flange or shoulder 50. A coiled compression spring 51 acts against the inner end of said plunger 49, said spring 51 being confined in a recess 52 by means of a plug 53 carried by the rotatable element 40. Its proportions are such that the extremity of the plunger 49 is capable of projecting slightly beyond the end of the cylindrical portion 41 an amount equal to the predetermined maximum clearance between the brake band lining and the brake drum flange.

Initially the parts are assembled as shown in Fig. 2, wherein the brake band is in its contracted position so that the brake drum is free to rotate. Under such conditions the plungers 49 are pressed inwardly, and the bottoms of the grooves 43 bear against the extremities of the cylindrical portions 41 of the several rotatable elements whereby to frictionally engage the inclined surfaces of the co-operating screw threads, and to thus overcome the turning effect of the springs 46 on the rotatable elements 40. As the brake is expanded through the medium of the actuating mechanism, the brake band 15 moves radially away from said members 40 and is followed by the plungers 49 until the brake band lining 16 engages the flange 11, or until said plunger is limited by the flange 50. This "applied" position of the brake parts is shown in Fig. 3.

As the brake band lining 16 becomes worn, the clearance between said lining and flange 11, in the "off" position, increases until it reaches a condition in which the brake band disengages the extremity of the plungers 49 as the band is expanded. As soon as this occurs, the compression spring 51 becomes impotent and as a result the previously mentioned frictional engagement of the threaded elements is overcome, permitting the torsion springs 46 to turn their respective elements 40. Such turning movement is again arrested as soon as the members 40 have been moved outwardly sufficiently to cause the springs 51 to be compressed slightly. The movement each time will be comparatively slight, and the slack will be automatically taken up in steps throughout the life of the lining 16. Thereafter the lining may be replaced and the movable threaded members 40 screwed in again to their proper positions to limit the contraction of the brake band. In view of the fact that the parts of the automatic adjusting means are enclosed within the brake drum, they are thoroughly protected from being fouled by dirt, or injured mechanically.

Obviously, as the brake band lining wears, the amplitude of relative movement between the brake band ends 18 and 19 increases substantially three and one-seventh times the increase in radial movement, and for this reason it is desirable to provide the abutment 35 with self-adjusting means. One form of such adjusting means is shown in Figs. 1, 5, and 6, wherein a supporting member 55 is fixed on or integral with the dust plate 12, and said supporting member is longitudinally bifurcated or grooved as at 56. A rotatable member 57 is journaled in said bifurcation 56, it being held therein by a pair of transverse pins 58, and being held against longitudinal movement by annular end flanges 59 and 60 which are of greater width than the groove 56. The member 57 is provided with a substantially central longitudinal bore 61 the opposite ends of which have a right hand thread 62 and left hand thread 63 respectively, here shown as of the buttress type, and constituting sockets for the reception of correspondingly threaded studs 64 and 65. Said studs 64 and 65 have their threaded portions loosely fitted in the threaded sockets 62 and 63, and have their outer ends extending beyond the ends of the rotatable member 57 and disposed in the path of rotation of the ends of the brake band 15. Lugs 66 extend from said ends of the studs and are received in grooves 67 in the dust plate 12, whereby to be held against rotation but capable of longitudinal movement with reference to the axis of the member 57. From this it will be evident that rotation of the member 57 will cause the studs 64 and 65 to be moved toward or away from each other, thus decreasing or increasing the overall length of the abutment. Each of the studs 64 and 65 carries a plunger 68, compression spring 69, and plug 70 similar to the corresponding members 49, 50, and 52 of the adjustable supporting means 17, and rotation of the member 57 is effected by a torsion spring 71 which has a central loop 72 embracing an anchoring pin 73 in the member 57, and which has its opposite ends coiled in opposite directions and its extremities disposed in eccentric holes 74 and 75 in the inner ends of the studs 64 and 65.

The operation of the self-adjusting means in the abutment 35 is similar to that of the adjustable supports 17. Under normal conditions of clearance between the brake band lining 16 and the drum flange 11, the springs 69 are sufficiently compressed to cause frictional binding of the co-operating threaded elements and thus to prevent rotation of the member 57. When the lining wears, however, beyond a predetermined amount, the plungers 68 are prevented from following the ends of the expanding brake band, and under such conditions, the friction between the threads is reduced and overcome by the torsion spring 71, which turns the member 57 in such a direction as to move the studs 64 and 65 outwardly away from each other.

By increasing the length of the abutment to compensate for wear of the lining, the actuating means is at all times maintained in proper connection with the ends of the brake band and free from lost motion which might otherwise be present. While the automatic adjustment is in itself desirable because of reduction in labor cost for upkeep of the vehicle, the elimination or substantial reduction of lost motion is even more important because it makes possible the use of increased leverages as compared with present practices, and such increase in leverage will make possible the simplification of the brake actuating means particularly in heavy trucks, busses and the like. As the brake band is expanded while the drum is rotating, the accumulated torque will substantially augment the braking force applied through the braking mechanism, and the floating connection of said mechanism is extremely important in the production of this new result. The invention is extremely simple in construction and capable of being economically produced. Obviously the invention is susceptible of numerous modifications in the details of construction and arrangement of parts, and the right is herein reserved to make such changes as fall within the scope of the appended claims without departing from the spirit of the invention.

Having thus described my invention, what I claim is:

1. In combination with a rotatable brake drum and a brake band adapted for frictional engagement therewith, automatic adjusting means to compensate for wear of the brake, said adjusting means including a fixed screw-threaded member, a cooperating screw-threaded member movable longitudinally with reference thereto, and adapted to engage the same, a torsion spring normally tending to rotate said movable member to feed it toward the brake band, and tension means mutually engaging the brake band and the movable threaded member whereby to prevent rotation of said movable threaded member within predetermined limits of clearance between the brake band and the brake drum.

2. In combination with a rotatable brake drum and a brake band adapted for frictional engagement therewith, automatic adjusting means to compensate for wear of the brake, said adjusting means including a fixed screw-threaded member, a co-operating screw-threaded member movable longitudinally with reference thereto, and adapted to engage the same, a torsion spring normally tending to rotate said movable member to feed it toward the brake band, and tension means mutually engaging the brake band and the movable threaded member whereby to prevent rotation of said movable threaded member within predetermined limits of clearance between the brake band and the brake drum, said tension means including a plunger mounted for limited longitudinal movement in the outer end of the movable threaded member, and a compression spring bearing against said plunger.

3. In a brake, a brake drum, a brake band adapted to be alternately engaged with and disengaged from said brake drum, and a plurality of stop members to limit the disengaging movement of the brake band to maintain a predetermined clearance, said stop members including spring-actuated automatically rotatable elements.

HUGH M. ROCKWELL.